Aug. 24, 1965 B. J. WARMAN 3,202,767

SCANNING CIRCUIT ARRANGEMENTS

Filed July 16, 1962 4 Sheets-Sheet 2

3,202,767
SCANNING CIRCUIT ARRANGEMENTS

Bloomfield James Warman, Charlton, London, England, assignor to Associated Electrical Industries Limited, London, England, a British company Filed July 16, 1962, Ser. No. 209,934
Claims priority, application Great Britain, July 31, 1961, 27,720/61
6 Claims. (Cl. 179—18)

Figure 1:
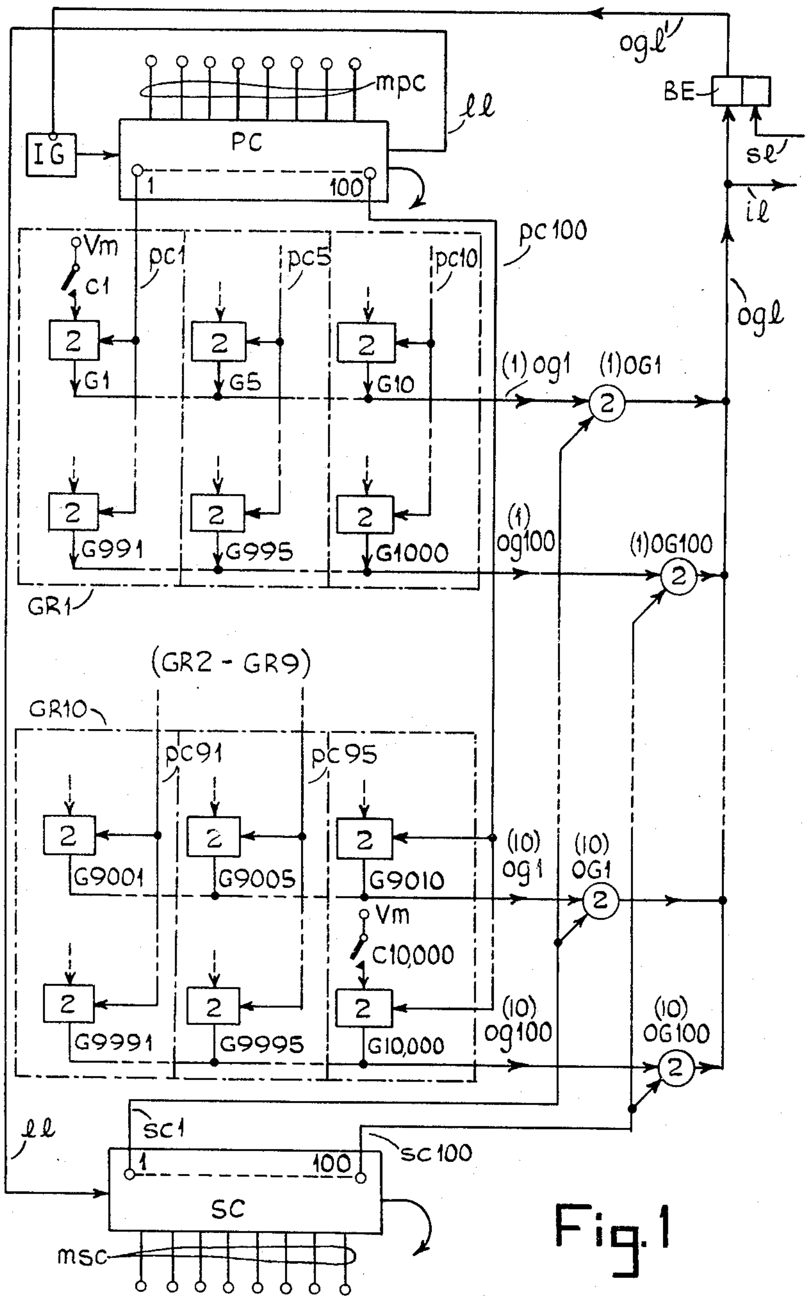

This invention relates to scanning circuit arrangements of the kind adapted to scan, usually recurrently, each of a plurality of circuits in turn and effective upon encountering a circuit of said plurality exhibiting a distinctive marking to provide an indication enabling such marked circuit to be identified. Such a scanning circuit arrangement has a number of well-known applications in automatic telephone exchange systems for instance. Thus it may be employed in conjunction with a plurality of registers for indicating to a single translator a register that is marked as requiring its services, or it may be employed in conjunction with subscribers' line circuits for indicating a line circuit that is in a calling or other marked condition.

According to the present invention a scanning circuit arrangement of the above kind comprises a plurality of individual coincidence gates which are divided into a number of groups, each such group being itself divided into a number of sub-groups with corresponding gates from the several sub-groups in each group having their outputs connected in common to a first input of a further, output, coincidence gate, there being a group of said output gates for each group of individual gates. There is a first pulse-distributing cyclic counter having for each sub-group of gates an individual output lead which is connected in common to a first input of all the individual gates in that sub-group, and a second pulse-distributing cyclic counter having a plurality of output leads. The output gates in each group thereof have their second inputs respectively connected to said second counter output leads each in common with the second inputs of the corresponding output gates in the other groups thereof. As a result of this arrangement with one counter driven to provide an output signal on each of its output leads recurrently in turn, with the other counter connected to be stepped once per cycle of the driven counter and likewise providing an output signal on each of its output leads recurrently in turn, and with said individual coincidence gates allocated to respective circuits to be scanned and each having a second input connected to receive a marking signal from its associated circuit, the coincidence at one of the individual gates of a marking signal and an output signal from said first counter will cause that gate to pass a signal to the relevant output gate while the coincidence at an output gate of such signal and an output signal from said second counter will cause this output gate to produce a signal on the occurrence of which the combined count reached by said first and second counters will be indicative of the marked individual gate and thus of the circuit associated with it.

In carrying out the invention the first counter is preferably the driven counter and may be connected so as once per cycle thereof to step the second counter one step. The individual coincidence gates may then be respective so-called pulse-plus-bias gates each having its first input connected to receive an output signal from the first counter as an input pulse, and its second input connected to receive a marking as a bias input which, when present, opens the gate and permits it, on occurrence of a pulse input, to pass a signal to the relevant output gate. More than one of the individual gates may be receiving a marking signal at any time, so that when the individual gates of a sub-group receive a signal from the first counter over its relevant output lead, signals may be passed to more than one output gate. However as the output gates concerned belong to the same group, only one of them will be receiving an output signal from the second counter, so that this gate alone will produce an output signal and the marked individual gate from which it received one of its inputs, and thus the circuit associated with this marked gate, will be uniquely identified by the combined setting or count of the two counters on the occurrence of this signal.

The scanning circuit arrangement of the invention permits the use of counters producing only relatively low power output signals, this particularly being the case when pulse-plus-bias gates are employed as the individual gates. As a consequence low power components, for instance low power transistors, may be used for the output gates and elsewhere in the circuits of the arrangement. Also with the grouping and sub-grouping of the individual gates in the manner set forth these gates are effectively scanned one sub-group at a time. Thus only a relatively small number of these gates, significantly less than the total number, are receiving scanning signals at any one time so that more liberal tolerances are possible in the timing requirements of coincidence signals than would be the case if the total number of gates were scanned as a whole.

For the identification of the circuits associated with the individual coincidence gates, the first and second counters may include respective groups of identification leads, additional to their output leads, on which they can apply respective unique combinations of identification signals in accordane with the count which they have reached at any time. Since each combination of marking signals is present only momentarily during the scanning action this action may be temporarily halted when a marked circuit is reached so as to maintain for as long as required the combination of marking signals identifying that circuit on the identification leads. Conveniently this may be achieved by arranging that a signal produced by any output gate as a consequence of a marked circuit being reached causes a bistable circuit to change its state and establish a condition which inhibits the application of driving pulses to the driven counter. The output gate signal may also be applied to external circuitry indicating that the identity of a marked circuit is available, and such external circuitry may be effective, after utilising or registering the identity, is reset the bistable circuit and thus permit scanning to recommence.

Figure 2:
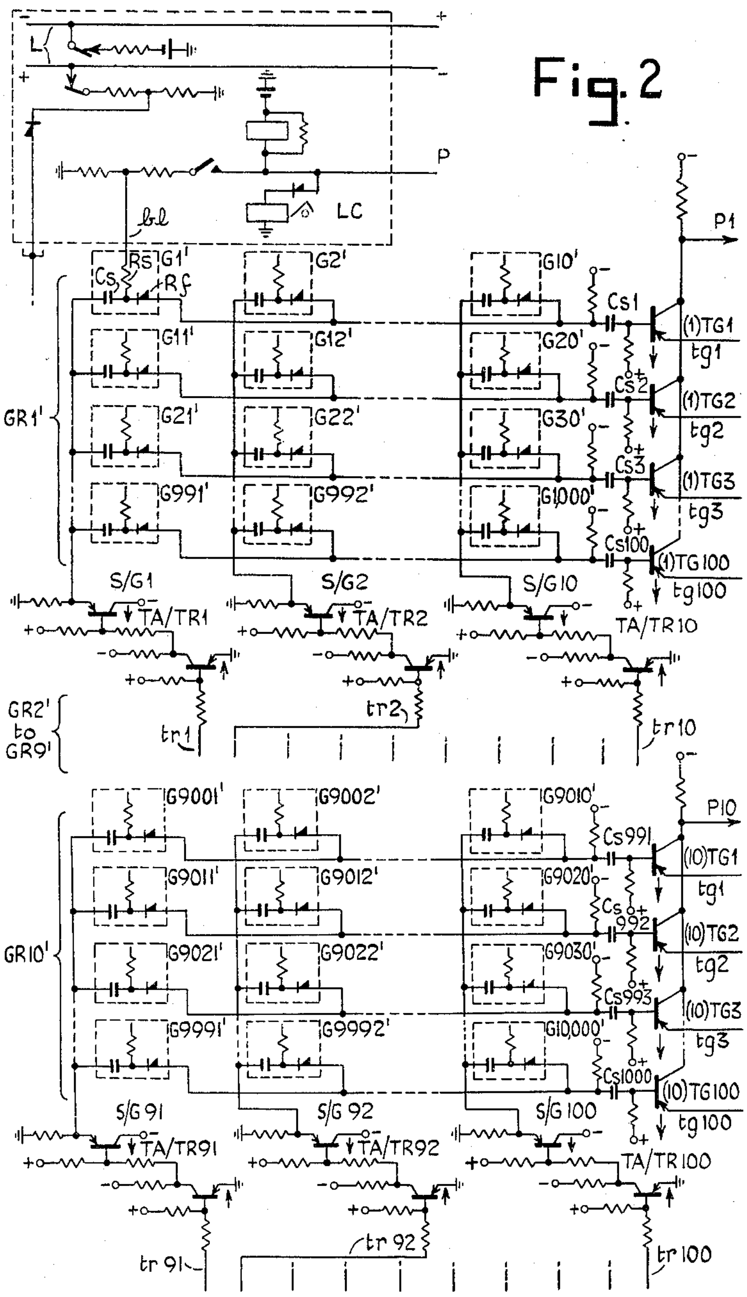
Figure 3:
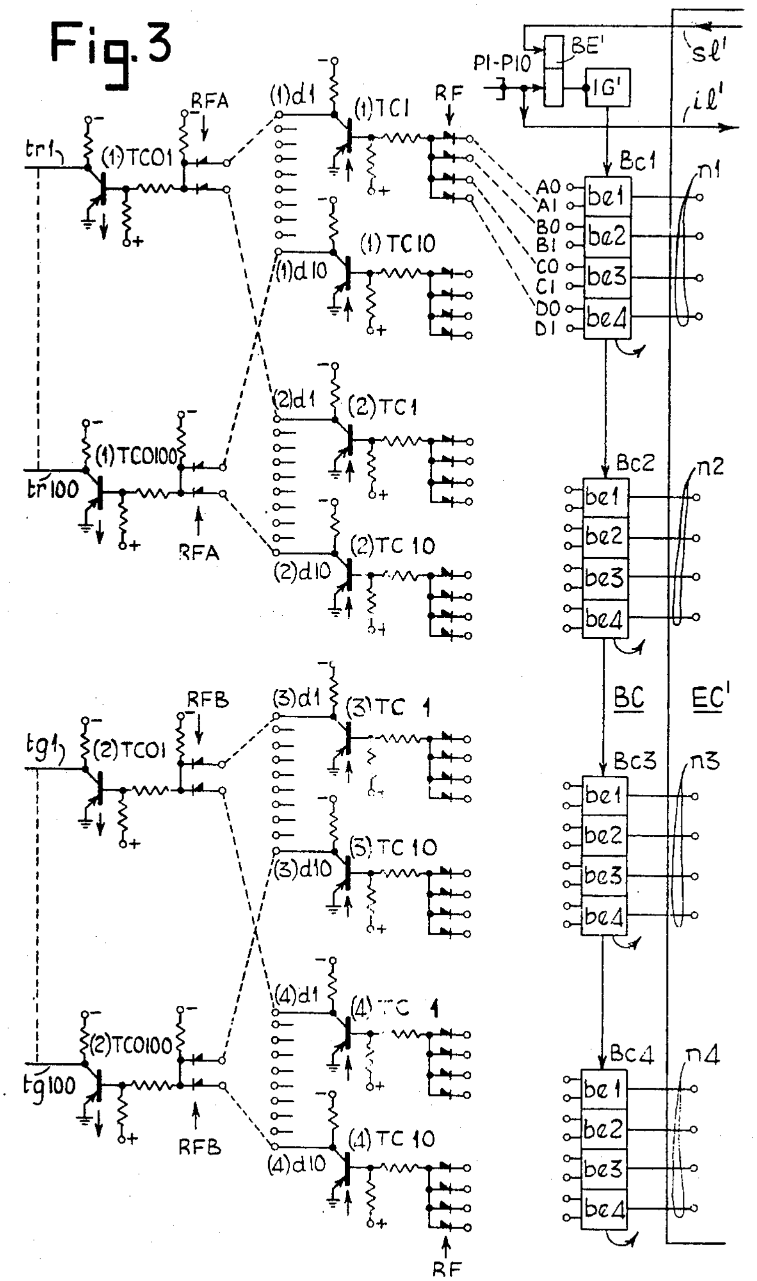
Figure 4:
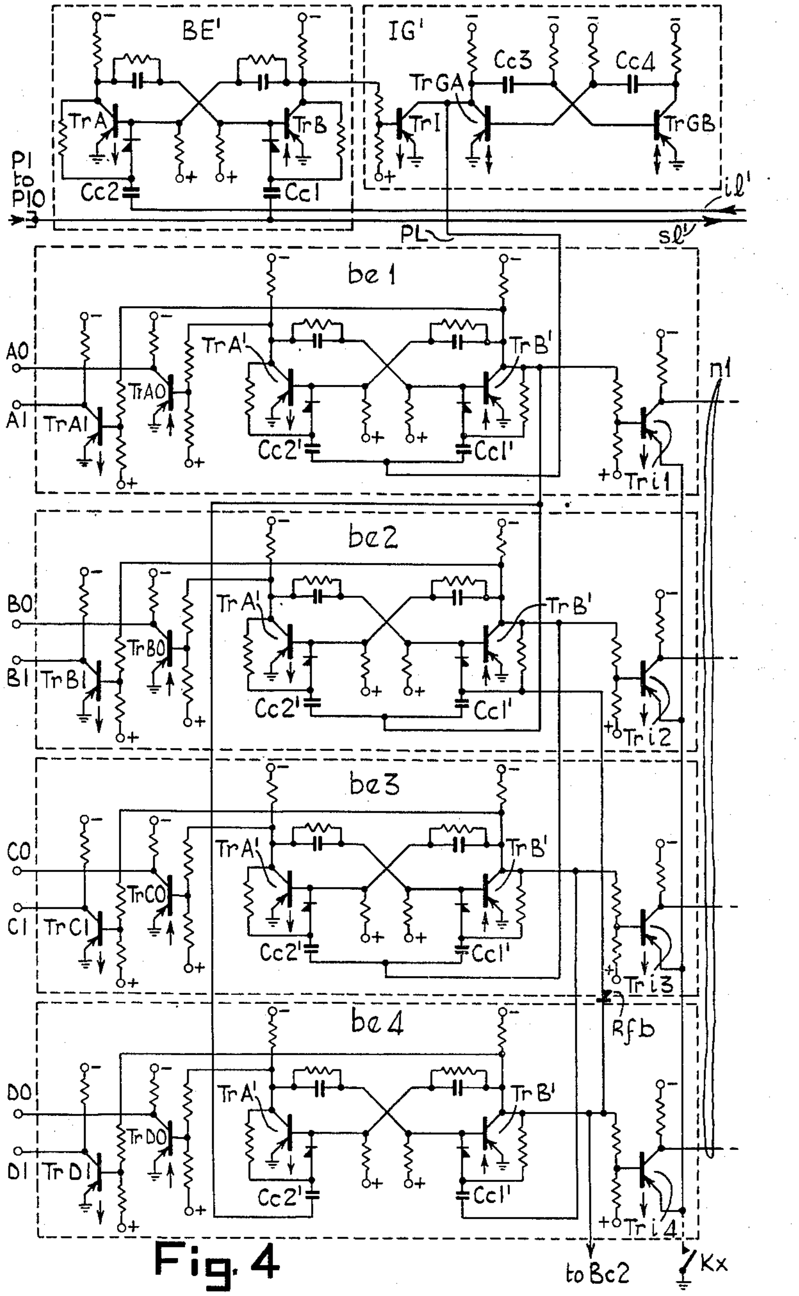

In order that the invention may be more fully understood reference will now be made by way of example to the accompanying drawings in which:

FIG. 1 is a schematic diagram of a scanning circuit arrangement conforming to the invention which has facility for scanning ten thousand circuits; and FIGS. 2, 3 and 4 show essential circuit details for the arrangement of FIG. 1 in its application in an automatic telephone exchange system for detecting and identifying subscribers' line circuits which have been locked out of service as a consequence of a permanent loop condition on their line wires.

Referring to FIG. 1, the scanning circuit arrangement there shown comprises: a primary cyclic counter PC which is connected to be driven by a series of pulses applied to it from an impulse generator IG and which has one hundred output leads *pc*1 . . . *pc*100 on which it recurrently provides an output signal in turn during stepping thereof; a secondary cyclic counter SC which is connected over a lead *ll* to the primary counter PC to receive a stepping pulse once per cycle of the latter and which likewise has one hundred output leads *sc*1 . . .

*sc*100 on which it recurrently provides an output signal in turn during stepping thereof; and ten thousand individual coincidence-of-two gates G1 . . . G10,000, only twelve of which are shown, which are respectively associated with a corresponding number of circuits (not shown) to be scanned by the arrangement and which are divided into ten groups GR1 . . . GR10, each of which contains a different thousand of these gates. In turn, the thousand gates in each of the groups GR1 . . . GR10 are divided into ten sub-groups of one hundred gates each so that there is a hundred such sub-groups in all.

In FIG. 1 the sub-groups are the vertical columns of individual gates in the groups GR1 . . . GR10 and in respect of each sub-group there is connected in common to one input of all its gates an individual one of the primary counter output leads *pc*1 . . . *pc*100. Thus, for example, in group GR1 the hundred gates in the left-hand vertical column or sub-group (which sub-group is represented by the gates G1 and G991 only but which also includes every tenth subsequent gate G11, G21, G31 and so on up to gate G981) have one input connected in common to the first primary counter output lead *pc*1; while in group GR10 the hundred gates in the right-hand vertical column or sub-group (which sub-group is similarly represented by the gates G9010 and G10,000 only but which also includes every tenth subsequent gate G9020, G9030, G9040 and so on up to gate G9990) have one input connected in common to the hundredth primary counter output lead *pc*100. The other input of each of the gates G1 . . . G10,000 is connected to the circuit with which the gate is individually associated and receives a marking signal from that circuit when the latter is operated to a condition for which the scanning circuit arrangement is required to detect and identify it. Such marking signal is provided by a voltage source V*m* (as shown only for gates G1 and G10,000) connectible to the gate input through a normally-open contact, such as contact *c*1 for gate G1 and contact *c*10,000 for gate G10,000, which is closed when the circuit is thus operated.

The arrangement also includes a further thousand coincidence-of-two output gates (only four being shown) which are divided into ten groups (1) OG1 . . . (1) OG100, (2) OG1 . . . (2) OG100 to (10) OG1 . . . (10) OG100 of one hundred gates each, there being one such group for each of the individual gate groups GR1 . . . GR10. Corresponding ones of the individual gates G1 . . . G10,000 from the ten sub-groups in each of the groups GR1 . . . GR10 have their outputs connected in common to a first input of an individual one of the output gates in the associated output gate group. Thus, for example, the first individual gate in each of the ten sub-groups of group GR1, that is, the ten gates G1 . . . G5 . . . G10, have their outputs connected in common over a lead (1) *og*1 to one input of the output gate (1) OG1, while the last individual gate in each of the ten sub-groups of group GR10, that is the ten gates G9991 . . . G9995 . . . G10,000, have their outputs connected in common over a lead (10) *og*100 to one input of the output gate (10) OG100.

As regards the other inputs of the output gates (1) OG1 . . . (10) OG100, those of the corresponding output gates in the several groups thereof are connected in common to an individual one of the secondary counter output leads *sc*1 . . . *sc*100. Thus these other inputs of the ten (OG1) gates are connected in common to the secondary counter output lead *sc*1, those of the ten (OG2) gates are connected in common to the secondary counter output lead *sc*2, and so on, with those of the ten (OG100) gates being connected in common to the secondary counter output lead *sc*100.

Considering now the operation of the scanning circuit arrangement, with the two counters PC and SC providing their respective output signals on output leads *pc*1 and *sc*1, each of the hundred individual gates in the left-hand sub-group of group GR1, that is gates such as G1 and G991, has the signal on lead *pc*1 applied to one of its inputs, while each of the ten output gates (1) OG1, (2) OG1 . . . (10) OG1 has the signal on lead *sc*1 applied to one of its inputs: for this setting the scanning circuit arrangement is in effect testing the circuit with which the individual gate G1 is associated. If the contact *c*1 in this circuit is closed then the gate G1 is also receiving a marking signal as aforesaid, and the coincidence of this marking signal and the primary counter output signal causes the gate G1 to open and pass a signal over lead (1) *og*1 to the output gate (1) OG1 which, also receiving the secondary counter output signal, opens to produce a signal on an output lead *ogl* which is common to all the output gates (1) OG1 . . . (10) OG100. Although one or more other gates in the left-hand sub-group of group GR1 may be receiving a marking signal and so be passing a signal to the relevant one of the other output gates (1) OG1 . . . (1) OG100, no corresponding output signal will be produced on the lead *ogl* by reason that all these output gates, except the first, are unprimed by the counter SC and are therefore closed. The setting of the counters PC and SC at this time, that is their combined count (1, 1), therefore uniquely corresponds to the circuit with which the gate G1 is associated, and only this gate can give rise to an output signal on lead *ogl*, with such a setting of the counters PC and SC.

When the primary counter PC is stepped one step by a pulse applied to it from the impulse generator IG, it removes its output signal from lead *pc*1 and applies it instead to lead *pc*2. For this setting of the counters PC and SC any marked gate in the second sub-group in group GR1 can pass a signal to the relevant one of the output gates (1) OG1 . . . (1) OG100. However, it is a signal from gate G2 only which will result in a signal appearing on the lead *ogl* because, as before, the output gate (1) OG1 is the only one in the group which is primed by the secondary counter SC. This latter setting or combined count of (2, 1) of the counters PC and SC therefore uniquely corresponds to the circuit with which the gate G2 is associated. In similar fashion, when the counter PC is stepped a further step the first gate (G3) in the next sub-group of group GR1 will cause a signal to appear on lead *ogl* if it is marked. The first gate in the remaining sub-groups of group GR1 are likewise scanned in turn on successive steps of the counter PC, following which the first gates in the sub-groups of the next group GR2 are scanned in turn for further counter steps, and so on, until the end of the stepping cycle of the counter PC. When the first gate G9010 in the last sub-group of the last group GR10 has been scanned the counter SC is stepped one step by the counter PC. The second output gates (1) OG2, (2) OG2 . . . (10) OG2 in the several groups thereof are now primed by the secondary counter SC so that for the next stepping cycle of the counter PC it is the second gate in each sub-group which is scanned and which, if marked, causes an output signal to appear on lead *ogl*. The remaining individual gates are likewise scanned in turn and the foregoing operation is cyclically repeated thereafter.

If the connections of the output leads *pc*1 . . . *pc*100 and *sc*1 . . . *sc*100 are interchanged (that is, the former leads are connected to the output gates (1) OG1 . . . (10) 100 and the latter leads are connected to the individual gates G1 . . . G10,000) or, equivalently, if the counter SC is driven by the impulse generator IG and the counter PC is stepped by the counter SC once per cycle of the latter, then the individual gates G1 . . . G10,000 are still scanned in turn and each is uniquely associated with a particular combined count of the two counters PC and SC. However, for this possible modification the sequence of scanning is altered, being now such that all the gates of each sub-group are scanned one at a time, before those of a subsequent sub-group.

The counters PC and SC have respective groups of identification leads *mpc* and *msc* to which they apply unique combinations of marking signals in accordance with the count which they have reached at any time. Since, as aforesaid, their combined count is different for each of the gates G1 . . . G10,000, and thus for each of the circuits respectively associated with these gates, the different combinations of marking signals correspond to, and thereby serve to identify these circuits. During stepping of the counters PC and SC the different combinations of marking signals appear only momentarily on the marking leads *mpc* and *msc,* their actual duration being determined by the repetition rate of the driving pulses produced by the impulse generator IG, so that it may be desirable to halt the scanning circuit arrangement when a marked circuit is encountered so as to maintain on the leads *mpc* and *msc* the marking signal combinations identifying such circuit. Conveniently this may be achieved by including in the scanning circuit arrangement a bistable element BE which is connected to be set by the signal appearing on the lead *ogl* as a consequence of a marked circuit being encountered. When set the bistable element BE applies over a lead *ogl'* to the impulse generator IG a signal which inhibits the application of driving pulses to the counter PC. The signal on the lead *ogl* is also applied over a lead *il* to external circuitry to indicate that the identity of a marked circuit is available on the leads *mpc* and *msc.* Once such circuitry has taken this information it applies over a lead *sl* a signal which resets the bistable element BE. This removes the inhibiting signal from the lead *ogl'* thereby allowing the scanning action to restart. It is to be appreciated that the external circuitry may be arranged to respond sufficiently quickly to the signal applied to it over lead *il* to record the identity of a marked circuit without having to temporarily stop the scanning action. The bistable circuit BE would not then be required.

Turning now to FIGS. 2–4 which show essential circuit details of a scanning circuit arrangement conformto the invention. This arrangement is assumed to be employed in an automatic telephone exchange for detecting and identifying subscribers' line circuits which have been locked out of service following a so-called permanent loop condition of their line wires. A permanent loop condition and the circumstances in which it can arise are well known in the telephone art and therefore an explanation thereof is not thought to be necessary for the present purposes. Also, it is not thought necessary to give any description of the manner in which a locked-out line circuit is restored to service following its detection and identification by the arrangement of the invention.

The scanning circuit arrangement to be described has facility for scanning ten thousand subscribers' line circuits, one of which is exemplified at LC in FIG. 2. In the permanent loop condition of such line circuit a negative bias potential is present on an individual bias lead such as lead *bl* thereof. The arrangement has ten thousand pulse-plus-bias gates G1' . . . G10,000', exemplified by the twenty-four shown in FIG. 2, which are respectively associated with the ten thousand line circuits, the gate G1' being associated with the line circuit LC. These gates G1' . . . G10,000' are arranged in ten groups GR1' . . . GR10' of one thousand gates each, these groups in turn being respectively divided into ten equal sub-groups S/G1 . . . S/G10 to S/G91 . . . S/G100 in the same manner as the gates G1 . . . G10,000 of FIG. 1. As shown for gate G1', each pulse-plus-bias gate has a bias input resistance R*s* connected to the bias lead *bl* of its associated line circuit and is biased open when the line circuit is in a permanent loop condition by the negative bias potential present on that lead. Each of the pulse-plus-bias gates G1' . . . G10,000' also has an individual pulse input capacitor and an individual rectifier, such as capacitor C*s* and rectifier R*f* in gate G1', the connection to which will be considered presently. By suitable choice of the values of the bias input resistance and the pulse input capacitor these components can provide a time constant which, being relatively long as compared with any transients arising in the line circuit, for example as a result of contact bounce of a line circuit relay, guards the circuit scanning arrangement against false operation in response to such transients.

Also included in the scanning circuit arrangement are ten groups of a hundred normally non-conductive gating transistors (1) TG1 . . . (1) TG100 to (10) TG1 . . . (10) TG100, one for each of the ten gate groups GR1' . . . GR10': these gating transistor groups correspond to the ten groups of output gates (1) OG1 . . . (1) OG100 to (10) OG1 . . . (10) OG100 in FIG. 1. The output rectifiers, such as rectifier R*f*, of corresponding pulse-plus-bias gates of the several (S/G) sub-groups thereof in each of the gate groups GR1' . . . GR10' are connected in common through a capacitor to the base of an individual one of the gating transistors. Thus in group GR1' the first gates G1', G2' . . . G10' of the ten sub-groups S/G1, S/G2 . . . S/G10 have their output rectifiers connected in common through a capacitor C*s*1 to the base of gating transistor (1) TG1, the second gates G11', G12' . . . G20' of these sub-groups have their output rectifiers connected in common through a capacitor C*s*2 to the base of gating transistor (1) TG2, and so on, with the last gates G9991', G9992' . . . G10,000' of the ten sub-groups S/G91 . . . S/G100 in group GR10' having their output rectifiers connected in common through a capacitor C*s*1000 to the base of gating transistor (10) TG100.

The arrangement further includes a hundred pairs of amplifying and phase-reversing transistors TA/TR1 . . . TA/TR100, one pair for each of the sub-groups S/G1 . . . S/G100. The two transistors of each such pair are cascade connected, the input (lower) transistor of the pair being normally conductive, and the output (upper) transistor of the pair being normally non-conductive and having its emitter connected in common to the input capacitors, such as capacitor C*s* of gate G1', of all the gates in the appertaining S/G sub-group. It might here be mentioned that the downward pointing arrow adjacent each output transistor of the hundred pairs denotes the normally non-conductive state of this transistor, while the upward pointing arrow adjacent the input transistor of each pair denotes its normally conductive state. This convention for indicating the normally non-conducting or conducting state of transistors has also been used for the other transistors employed in the circuits of FIGS. 2–4.

A first group of one hundred leads *tr*1 . . . *tr*100 are respectively connected through individual resistances (unreferenced) to the base of the input (lower) transistors of the hundred transistor pairs TA/TR1 . . . TA/TR100: this group of leads corresponds to the group of primary counter output leads in FIG. 1. A second group of one hundred leads *tg*1 . . . *tg*100, corresponding to the group of secondary counter output leads in FIG. 1, are connected to the emitters of the gating transistors (1) TG1 . . . (10) TG100, corresponding gating transistors in each of the several groups thereof having their emitters commoned to individual ones of these leads.

In a manner to be described presently, in operation of the scanning circuit arrangement a positive (earth) signal is applied in turn to each of the leads *tg*1 . . . *tg*100 whereby to prime one gating transistor in each of the ten groups (1) TG1 . . . (1) TG100 to (10) TG1 . . . (10) TG100 in readiness for conduction. This positive signal remains on each of the leads *tg*1 . . . *tg*100 for the duration that a second positive (earth) signal is applied to each of the leads *tr*1 . . . *tr*100 in turn. In consequence of this latter positive signal on a (*tr*) lead the relevant (TA/TR) transistor pair has its input transistor cut off. The resulting negative potential at the collector of this input transistor renders the output transistor of the pair conducting with the result that a negative signal is applied from the emitter thereof to the input capacitor of each of the pulse-plus-bias gates in the appertaining (S/G) sub-group. If any of these gates is biased open by the negative bias potential from its associated line circuit then in response to the applied negative signal such gate will pass a negative signal via its output rectifier to the base of the relevant one of the gating transistors (1) TG1 . . . (10) TG100: if primed by a positive signal at its emitter as aforesaid, the gating transistor concerned will produce a positive output signal at its collector. It will be evident from the description previously given of the operation of the schematic diagram of FIG. 1, that in the present instance only one pulse-plus-bias gate at a time can cause the production of such output signal from the collector of a gating transistor, the particular gate permitted to do so being determined in accordance with which of the two leads, one in a group *tg*1 . . . *tg*100 and one in group *tr*1 . . . *tr*100, the two (positive) earth signals are present on.

The two positive (earth) signals are produced cyclically on the lead groups *tr*1 . . . *tr*100 and *tg*1 . . . *tg*100 by means of a binary counting and pulse-distributing counter which includes cross-connection strapping field for converting binary marking signals produced thereby into two 1-out-of-100 (decimal) marking signals constituting the two positive (earth) signals. Such arrangement is shown in FIG. 3, partly in schematic form, and circuit details of schematic portions thereof are shown in FIG. 4.

Considering FIG. 3, the binary counting and pulse-distributing counter comprises: a binary counting circuit BC having four cyclically operable stages B*c*1 to B*c*4, each such stage comprising four cascade-connected bistable elements *be*1 to *be*4 which have respective pairs of binary marking leads A0/A1, B0/B1, C0/C1 and D0/D1; four groups of ten normally-conductive "binary-to-decimal" converting transistors (1) TC1 to (1) TC10, (2) TC1 to (2) TC10, (3) TC1 to (3) TC10 and (4) TC1 to (4) TC10 respectively associated with the four stages B*c*1 to B*c*4; and two groups of a hundred normally non-conductive "2-out-of-20 to 1-out-of-100" coding transistors (1) TCO1 to (1) TCO100 and (2) TCO1 to (2) TCO100. The first stage B*c*1 of the binary counting circuit BC is connected to be stepped by an impulse generator IG′, and each of the remaining stages B*c*2 to B*c*4 is connected to be stepped one step by the immediately preceding stage once per cycle of the latter.

As will be described in detail later with reference to FIG. 4 each of the four counter stages B*c*1 to B*c*4 has interconnections between its four bistable elements *be*1 to *be*4 appropriate for the stage providing a count of ten for each cycle thereof instead of the count of sixteen normally provided by four cascade-connected bistable elements. For the ten different possible settings of each counting stage during its count of ten, respective unique combinations of positive and negative binary signals appear on the marking leads A0 . . . D1 of its bistable elements. These ten unique combinations of binary signals correspond to ten decimal digit values, namely 1–10, to be provided by each counting stage. To convert these binary signals into respective 1-out-of-10 decimal signals the marking leads A0 . . . D1 are cross-connected through individual rectifiers RF to the bases of the ten converting transistors TC1 . . . TC10 of the appertaining group thereof, which transistors pertain respectively to the ten decimal digit values. For each of the four counting stages B*c*1 to B*c*4 and the appertaining group of converting transistors the cross-connections are the same and are given in the following table together with the combinations of binary signals and their corresponding decimal digit values: in the table a "0" represents a positive binary signal and a "1" a negative binary signal.

*Table*

| Decimal Value | Binary Marking Signals on Leads | | | | | | | | Strapping Connections | Transistors to TC1-TC10 |
|---|---|---|---|---|---|---|---|---|---|---|
| | A0 | B0 | C0 | D0 | A1 | B1 | C1 | D1 | | |
| 1 | 1 | 0 | 0 | 0 | 0 | 1 | 1 | 1 | A1, B0, C0, D0 | TC1 |
| 2 | 0 | 1 | 0 | 0 | 1 | 0 | 1 | 1 | A0, B1, C0, D0 | TC2 |
| 3 | 1 | 1 | 0 | 0 | 0 | 0 | 1 | 1 | A1, B1, C0, D0 | TC3. |
| 4 | 0 | 0 | 1 | 0 | 1 | 1 | 0 | 1 | A0, B0, C1, D0 | TC4. |
| 5 | 1 | 0 | 1 | 0 | 0 | 1 | 0 | 1 | A1, B0, C1, D0 | TC5. |
| 6 | 0 | 1 | 1 | 0 | 1 | 0 | 0 | 1 | A0, B1, C1, D0 | TC6. |
| 7 | 1 | 1 | 1 | 0 | 0 | 0 | 0 | 1 | A1, B1, C1, D0 | TC7. |
| 8 | 0 | 0 | 0 | 1 | 1 | 1 | 1 | 0 | A0, B0, C0, D1 | TC8. |
| 9 | 1 | 0 | 0 | 1 | 0 | 1 | 1 | 0 | A1, B0, C0, D1 | TC9. |
| 10 | 0 | 0 | 0 | 0 | 1 | 1 | 1 | 1 | A0, B0, C0, D0 | TC10. |
| 1 | 1 | 0 | 0 | 0 | 0 | 1 | 1 | 1 | A1, B0, C0, D0 | TC1. |

By way of example there is shown in FIG. 3 for the counting stage B*c*1 and the group of converting transistors (1) TC1 . . . (1) TC10 the connections required in respect of the digit value 1, for which it can be seen from the above table that the corresponding combination of binary signals is 1000/0111. Thus for these connections and binary signals, four positive signals, namely the "0" signals on the leads A1, B0, C0 and D0, are applied to the base of the transistor (1) TC1 with the result that this transistor is rendered non-conducting and so applies a negative decimal signal from its collector to a decimal output lead (1) *d*1. All the other transistors (1) TC2 . . . (1) TC 10 are maintained conducting since each of them is receiving at least one negative signal on one of the particular four of the leads A0 . . . D1 to which their bases are connected, and positive signals are therefore present at their collectors.

The decimal output lead (1) *d*1 is one of a group of ten such output leads (1) *d*1 . . . (1) *d*10 which pertain respectively to the ten possible decimal digit values 1–10. The other three groups of converting transistors (2) TC1 . . . (2) TC10, (3) TC1 . . . (3 TC10 and (4) TC1 . . . (4) TC10 have corresponding groups of ten decimal output leads (2) *d*1 . . (2) *d*10, (3) *d*1 . . . (3) *d*10 and (4) *d*1 . . . (4) *d*10 to which their collectors are connected.

The two 1-out-of-10 negative decimal signals appearing on the respective lead groups (1) *d*1 . . . (1) *d*10 and (2) *d*1 . . . (2) *d*10 are required to be converted into the 1-out-of-100 positive (earth) signal which appears on the lead group *tr*1 . . . *tr*100. To this end the hundred different possible combinations of two of these decimal output leads, taken one from each group, are selectively connected through individual rectifier pairs RFA to the bases of respective coding transistors in the group (1) TCO1 . . . (1) TCO100 thereof. (By way of example the strapping connections in respect of the first transistor (1) TCO1 and the last transistor (1) TCO100 of this group are illustrated in FIG. 3.) Each of these coding transistors has a different one of the leads *tr*1 . . . *tr*100 connected to its collector and is normally held non-conductive, to maintain that lead at a negative potential, by a positive signal applied to its base over at least one of the two decimal output leads connected thereto. However, when both these latter leads have negative signals on them, namely when the two converting transistors to whose collectors they are respectively connected become non-conducting as a consequence of the circuit BC reaching a setting in which it applies the relevant combinations of positive signals to their bases, both rectifiers of the relevant (RFA) pair are backed off and the potential at the base of the coding transistor concerned falls negatively so causing this transistor to conduct and produce at its collector a positive (earth) signal which thus appears on the relevant (*tr*) lead. The two 1-out-of- 10 negative decimal signals appearing on the respective lead groups (3) d1 . . . (3) d10 and (4) d1 . . . (4) d10 are likewise converted into the 1-out-of-100 positive (earth) signal apearing on the lead group tg1 . . . tg100 by selectively connecting the leads of these latter decimal lead groups through individual rectifier pairs RFB to the bases of the second group of coding transistors (2) TCO100 . . . (2) TCO200, which latter have the leads tg1 . . . tg100 respectively connected to their collectors.

The identity of each of the pulse-plus-bias gates G1′ . . . G10,000′, and thus of the line circuit associated therewith, is given in turn by the circuit BC as it is stepped by the pulses applied to it from the impulse generator IG′. This identity is in the form of four particular combinations of binary marking signals, which combinations are applied respectively to four sets of identification leads n1 . . . n4 connected one set to each of the counting stages Bc1 . . . Bc4. The four combinations of marking signals identifying a particular pulse-plus-bias gate may each correspond to those which are also present either on the leads A0, B0, C0, D0, or on the leads A1, B1, C1, D1, of the relevant counting stage and which uniquely permit that gate, if it is marked by the associated line circuit, to cause as aforesaid the production of a positive output signal from the collector of the particular one of the gating transistors (1) TG1 . . . (10) TG100 which it feeds.

The ten groups of gating transistors (1) TG1 . . . (1) TG100 to (10) TG1 . . . (10) TG100 (FIG. 2) have respective output leads P1 . . . P10 to each of which the collectors of all the gating transistors of the relevant group thereof are connected in common. When a marked line circuit is encountered by the scanning circuit arrangement during its scanning action, the positive output signal produced at the collector of the gating transistor concerned is applied over the particular one of the output leads P1 . . . P10 to which that collector is connected to set a bistable element BE′: upon setting, the element BE′ produces a signal which inhibits the operation of the impulse generator IG′, thereby halting the scanning action. The signal from the gating transistor is also extended over a lead il′ to external circuitry EC′ to indicate that the identity of the marked line circuit is available on the four sets of identification leads n1 . . . n4. Once the circuitry EC′ has abstracted the marked circuit's identity, it applies over a lead sl′ a signal which resets the bistable element BE′, which latter thereupon removes the inhibiting signal from the impulse generator IG′, so allowing the scanning action to restart.

In FIG. 4 there are shown circuit details for the bistable element BE′, for the impulse generator IG′, and for the counting stage Bc1. Each of the other counting stages Bc2, Bc3 and Bc4 has circuit details identical with those of the stage Bc1. Consider first of all the bistable element BE′, this element comprises two transistors TrA and TrB having their bases and collectors mutually cross-coupled together in known fashion such that when one of these transistors is conducting it holds the other non-conducting, with change in the conductive states of these two transistors being effected by applying a positive signal to the base of the conducting transistor of the pair.

For the conductive states of the transistors TrA and TrB which is shown, namely transistor TrA non-conducting and transistor TrB conducting, the bistable element BE′ is in an unset condition. In this unset condition the positive potential at the collector of transistor TrB holds non-conductive an inhibiting transistor TrI in the impulse generator circuit IG′. When a positive output signal from one of the gating transistors (1) OG1 . . . (10) OG100 is applied to the commoned output leads P1 . . . P10, it causes the production across a capacitor Cc1 of a positive-going pulse which is applied to the base of the transistor TrB to set the bistable element BE′. In this set condition there is present at the collector of transistor TrB a negative signal which renders the inhibiting transistor TrI conducting. Resetting of the bistable element BE′ is effected by applying a positive-going pulse to the base of the now conducting transistor TrA, such pulse being produced across a second capacitor Cc2 from a positive signal applied to lead sl1′ from the external circuitry EC′.

The impuse generator IG′ is a multi-vibrator circuit comprising two transistors TrGA and TrGB. These two transistors have their bases and collectors cross-coupled through respective capacitors Cc3 and Cc4 which serve to determine the repetition frequency of stepping pulses applied to the circuit BC. The multi-vibrator is free-running and its two transistors TrGA and TrGB are rendered conductive alternately: each time the transistor TrGA becomes conductive the positive signal at its collector is applied over a pulse lead PL to the element be1 of the first counting stage Bc1. However, the free-running action of the multi-vibrator circuit is possible only when the inhibiting transistor TrI is non-conductive. This latter transistor has its collector connected to the collector of the transistor TrGA and therefore when it is rendered conductive by the bistable element BE′, the resulting positive potential at its collector prevents the conduction of transistor TrGA and thereby prevents running of the multi-vibrator circuit.

Each of the bistable elements be1 . . . be4 of the first counting stage Bc1 is similar to the bistable element be1 and comprises two cross-coupled transistors TrA′ and TrB′ which are rendered conductive alternately by means of applied stepping pulses. The four bistable elements be1 . . . be4 are cascade-connected in conventional manner except that the capacitor Cc2′ of the element be4 is fed from the collector of transistor TrB′ in element be1 and the base of transistor TrB′ in element be2 is connected through a rectifier Rfb to the collector of transistor TrB′ in element be4, whereby to give the counting stage Bc1 a cyclic count of ten as distinct from a cyclic count of sixteen normally afforded by a four-stage binary counting circuit. The other counting stages Bc2, Bc3 and Bc4 are similary modified so as to have a cyclic count of only ten. The bistable elements be1 . . . be4 have respective pairs of output transistors TrA0/TrA1, TrB0/TrB1, TrC0/TrC1 and TrD0/TrD1 associated with them. These transistor pairs have their collectors connected respectively to the leads A0/A1, B0/B1, C0/C1 and D0/D1, and their bases connected to the collectors of one or the other of the two transistors TrA′, TrB′ of the relevant bistable element. By reason of these connections when a bistable element is unset, that is its transistor TrA′ is non-conductive and its transistor TrB′ is conductive, the relevant "0" transistor (TrA0, TrB0, TrC0 or TrD0) is conductive so that a positive signal is present at its collector and thus on the output lead A0, B0, C0 or D0, as the case may be: at this time the relevant "1" transistor (TrA1, TrB1, TrC1 or TrD1) is non-conductive so that a negative signal is present at its collector and thus on the output lead A1, B1, C1 or D1 connected thereto. When a bistable element is set these signals are reversed so that a negative signal appears on the "0" lead and a positive signal on the "1" lead. For each setting of the counting stage Bc1 during its count of ten, the different combinations of positive and negative output signals are as set forth in the table given previously.

The bistable elements be1 . . . be4 also have respective third output transistors Tri1 . . . Tri4 associated with them which provide at their collectors the combinations of binary marking signals on the set of leads n1. The bases of these latter output transistors are connected to the collectors of the transistors TrB′ of the bistable elements and therefore provide the same combination of positive and negative marking signals as the four output transistors TrA1, TrB1, TrC1 and TrD1. There may be associated with the transistors Tri1 . . . Tri4, (and also with corresponding output transistors for the other counting stages be2 . . . be4) a normally-open contact K$x$ which controls the tpplication of earth potential to their emitters. With the contact K$x$ open the transistors T$ri$ . . . T$ri4$ would remain non-conducting irrespective of the polarity of signals applied to their bases from the associated bistable elements. External circuitry may then be responsive to the output signal applied to it over lead $sl1'$ to close the contact K$x$ whereby to render conductive those, if any, of the transistors T$ri1$ . . . T$ri4$, receiving a negative signal at their base so that the appropriate combinations of binary marking signals appear on the sets of leads $n1$ . . . $n4$.

What I claim is:

1. A scanning circuit arrangement comprising a plurality of individual coinciding gates each having first and second inputs and an output divided into a number of groups, each said group being further divided into a number of sub-groups, a plurality of groups of output coincidence gates each having first and second inputs and an output corresponding to said plurality of groups of individual gates, the corresponding gates from said sub-groups having their outputs connected in common to a first input of an individual one of said output gates, a first pulse-distributing cyclic counter having for each sub-group of gates an output lead which is connected in common to the first inputs of all the individual gates in that sub-group, a second pulse-distributing counter having a plurality of output leads, the output gates in each group thereof having second inputs respectively connected to said second counter output leads each in common with the second inputs of the corresponding output gates in the other groups thereof, means for driving said first pulse-distributing cyclic counter to provide an output signal on each of its output leads recurrently in turn, said second pulse-distributing counter being connected to said first counter and receiving a stepping pulse once per cycle of the latter to provide output signals successively on its output leads, each of said individual coincidence gates having a second input connected to a circuit to receive a marking signal therefrom, said scanning circuit arrangement being such that the coincidence at one of the individual gates of a marking signal and an output signal from said first counter will cause that gate to pass a signal to the relevant output gate while the coincidence at an output gate of such signal and an output signal from said second counter will cause this output gate to produce a signal on the occurrence of which the combined count reached by said first and second counters will be indicative of the marked gate and thus of the circuit associated with it.

2. A scanning circuit arrangement as claimed in claim 1, wherein each individual coincidence gate comprises a pulse-plus-bias gate having a pulse input constituting its said first input connected to receive an output signal from said first cyclic counter as an input pulse, and having a bias input constituting its said second input connected to receive a marking as an input bias which, when present, opens the gate and permits it, on occurence of an input pulse, to pass a signal to the relevant output gate.

3. A scanning circuit arrangement as claimed in claim 1 wherein each said output gate comprises a transistor gate including a transistor having base and emitter circuits which respectively constitute said first and second inputs for the gate, and having a collector circuit for producing an output signal from the gate in response to flow of collector current in the transistor consequent upon coincidence at its base and emitter circuits of the gate input signals.

4. A scanning circuit arrangement as claimed in claim 1 wherein for the identification of the circuits associated with the individual coincidence gates, said cyclic counters include respective groups of identification leads, additional to their output leads, and are operable to produce unique combinations of identification signals on these identification leads in accordance with the count which they have reached at any time.

5. A scanning circuit arrangement as claimed in claim 1 including a bistable circuit which, in response to a signal produced by any output gate as a consequence of a marked circuit being reached, is operable to change its state and establish a condition inhibiting the scanning action.

6. A scanning circuit arrangement as claimed in claim 1, particularly adapted for an automatic telephone exchanger wherein said circuit means comprises a plurality of subscribers' line circuits, and means in each line circuit for applying said marking signal to the second input of the individual coincidence gate provided therefor when the line is locked out of service because of a permanent loop condition.

References Cited by the Examiner

UNITED STATES PATENTS

| | | | |
|---|---|---|---|
| 2,563,589 | 8/51 | Hertog | 179—18 |
| 2,724,018 | 11/55 | Pouliart et al. | 179—18 |
| 3,015,697 | 1/62 | Klinkhamer | 179—18 |

ROBERT H. ROSE, *Primary Examiner.*